(12) United States Patent
Hansen

(10) Patent No.: US 6,457,733 B1
(45) Date of Patent: Oct. 1, 2002

(54) SPOTTING RECEIVER HITCH

(76) Inventor: Richard C. Hansen, 3943 Faraday, Boise, ID (US) 83713

( * ) Notice: Subject to any disclaimer, the term of this patent is extended or adjusted under 35 U.S.C. 154(b) by 0 days.

(21) Appl. No.: 09/756,254

(22) Filed: Jan. 3, 2001

(51) Int. Cl.⁷ .................................................. B60D 1/01
(52) U.S. Cl. ........................ 280/481; 280/501; 280/496
(58) Field of Search ......................... 280/481, 495–503

(56) References Cited

U.S. PATENT DOCUMENTS

| | | | |
|---|---|---|---|
| 2,880,016 A | | 3/1959 | Peterson .................... 280/491 |
| 3,287,027 A | | 11/1966 | Schuckman ................. 280/491 |
| 3,737,177 A | | 6/1973 | Gal .............................. 280/495 |
| 3,806,162 A | * | 4/1974 | Milner ........................ 280/502 |
| 4,714,265 A | * | 12/1987 | Franklin ................... 280/491.4 |
| 4,869,521 A | | 9/1989 | Johnson .................... 280/491.1 |
| 5,088,754 A | * | 2/1992 | Skelton .................... 280/491.3 |
| 5,476,279 A | * | 12/1995 | Klemensten ................ 280/495 |
| 5,636,885 A | | 6/1997 | Hummel ...................... 293/115 |
| 5,716,066 A | | 2/1998 | Chou et al. .................. 280/501 |
| 5,727,806 A | * | 3/1998 | McCoy et al. .............. 280/494 |

\* cited by examiner

*Primary Examiner*—Kevin Hurley
*Assistant Examiner*—Matthew Luby
(74) *Attorney, Agent, or Firm*—Frank J. Dykas; Robert L. Shaver; Stephen M. Nipper

(57) ABSTRACT

A front spotting trailer hitch assembly for use with vehicles having front tow hooks. This front hitch assembly works well for easily back trailers into positions, such as for storage. This front spotting trailer hitch assembly attaches to the front tow hooks and allows a user to attach a hitch ball to the hitch assembly for towing. This front spotting trailer hitch assembly is able to be quickly attached and detached from the vehicle having front tow hooks.

2 Claims, 5 Drawing Sheets

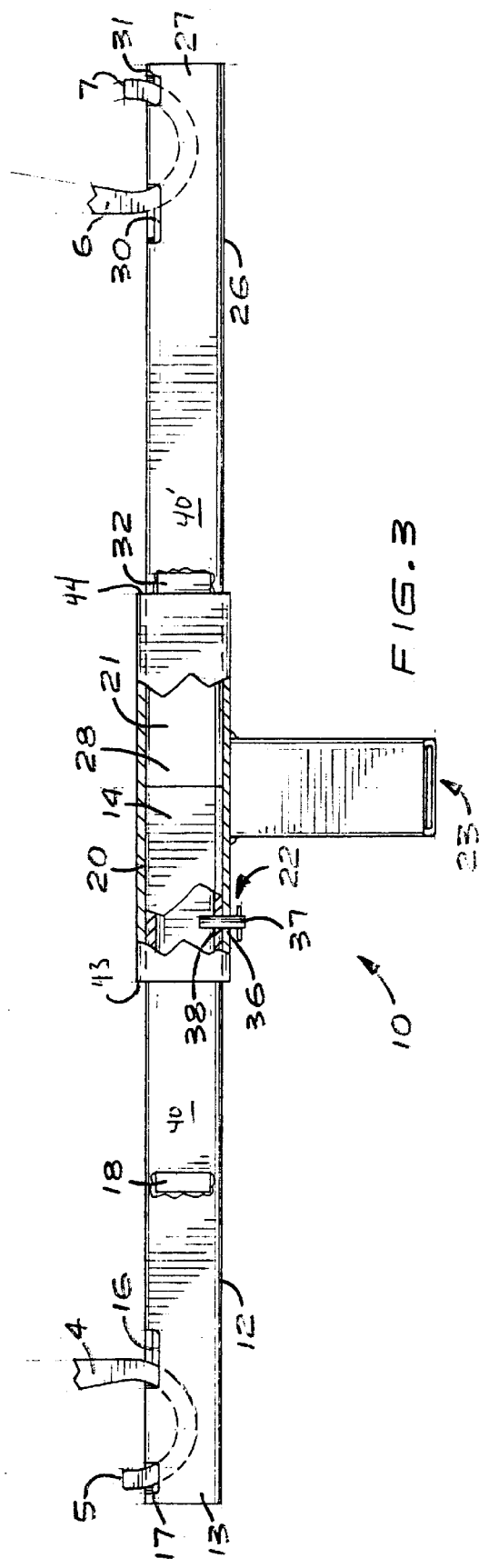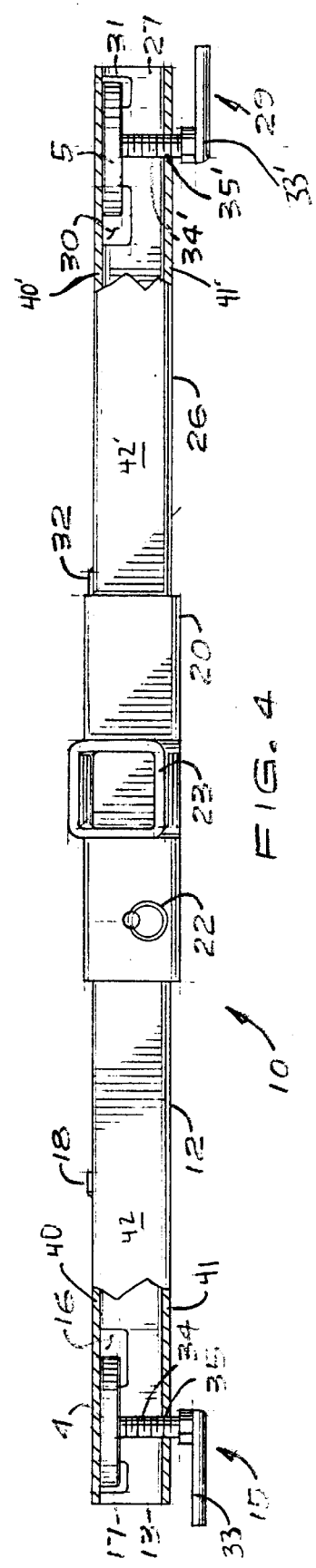

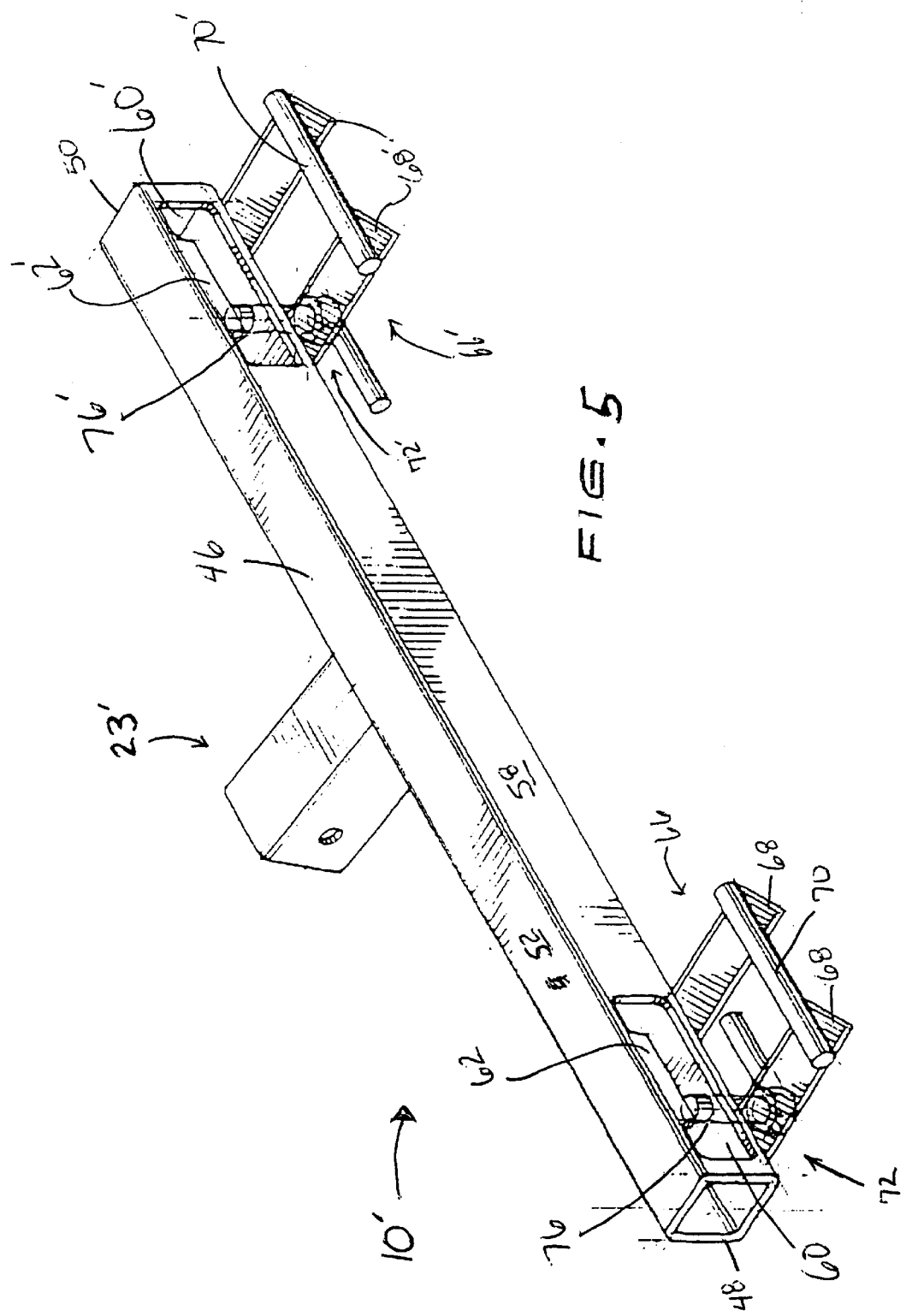

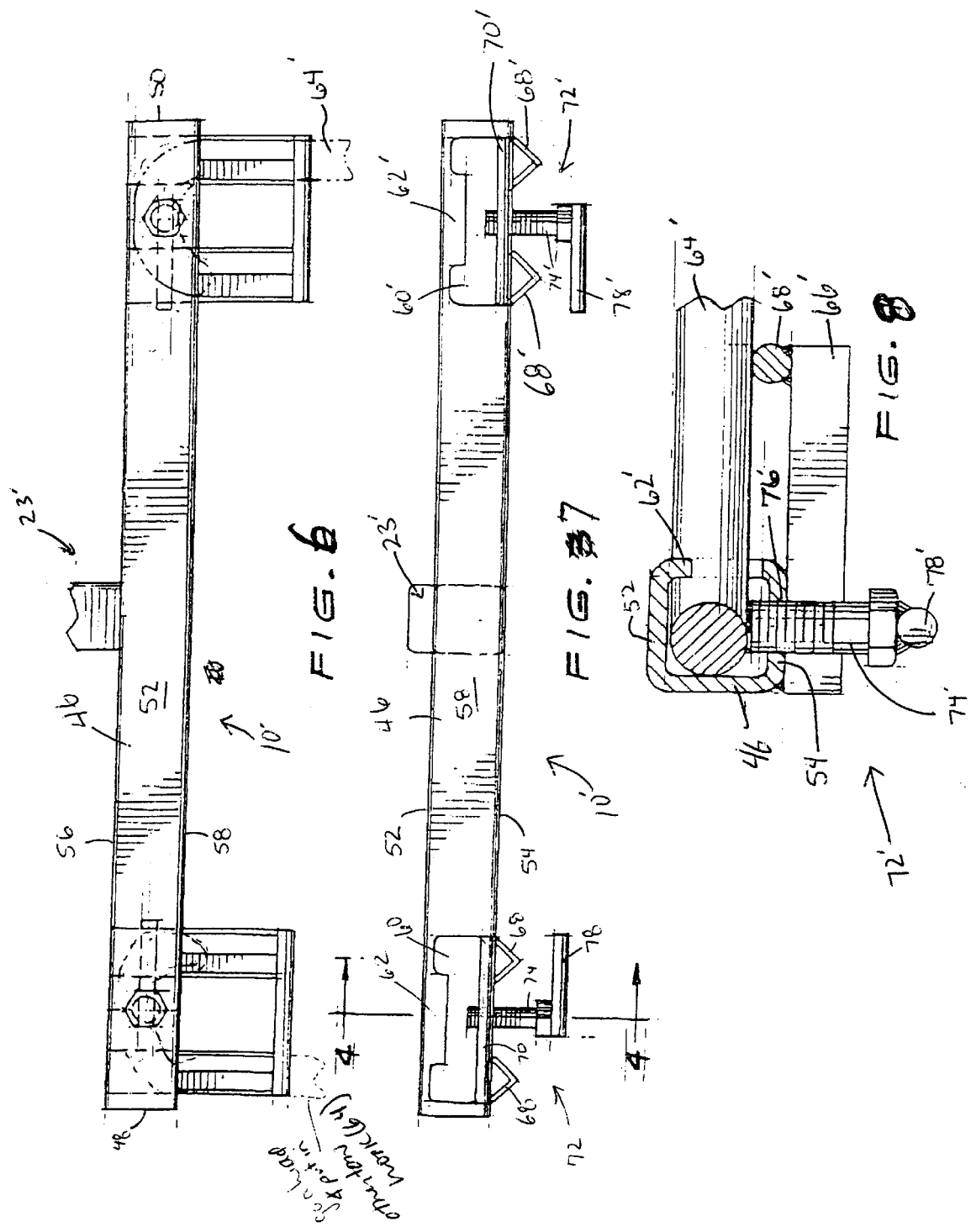

SPOTTING RECEIVER HITCH

BACKGROUND OF THE INVENTION

1. Field of the Invention

The present invention generally relates to trailer hitches, and more particularly to spotting hitches located on the front end of a vehicle for use in spotting a trailer into place.

2. Background Information

Many people use trailers for various purposes. One problem often associated with trailers is in backing them up. For most people, the task of moving a vehicle in reverse while towing a trailer proves to be an extremely difficult and challenging procedure. If done improperly, the vehicle trailer combination will tend to jackknife, possibly leading to property damage and/or injury to persons. Most of this problem is caused by the fact that the person backing the trailer is facing a direction different than which he or she is traveling. Thus, to compensate for the trailer moving to the left, the operator must turn the wheel to the right (and vice versa). For many people, this coordination is difficult.

Another disadvantage to backing a trailer using the prior art method is the fact that the user is typically located an entire vehicle length from the trailer. Particularly where the vehicle being used is large, the vehicle operator backing the trailer may not be able to see the trailer or may have limited visibility through the vehicle's side mirrors during the backing process.

What is needed is a method and/or device for use in backing a trailer which allows the vehicle operator to face the trailer being backed. What is also needed is a method of backing a trailer which uses a front hitch apparatus which is easy to install and uninstall on existing vehicles.

SUMMARY OF THE INVENTION

The present invention is a front hitch assembly for use with vehicles having front tow hooks, including those having a generally horizontally oriented first tow hook, and a generally horizontally oriented second tow hook. This invention is envisioned for use on all vehicles which have front tow hooks, whether these tow hooks be vertical, horizontal or other. One embodiment of the invented front hitch assembly comprises an elongated first frame piece having a first end extending to a second end, with the first frame piece attaching to the first tow hook. It is preferred the first frame piece further comprises at least one locking means for locking the first frame piece on the first tow hook. The first frame piece second end is additionally able to attach to a center receiver. This center receiver is for attaching the first frame piece to a second frame piece. The center receiver is further able to cooperate with a trailer hitch ball through use of a trailer hitch ball connector for connecting with a trailer hitch ball assembly containing a trailer hitch ball. The elongated second frame piece has a first end extending to a second end. The second frame piece is able to attach to the second tow hook, and preferably has at least one locking means for locking the second frame piece on the second tow hook. The second frame piece second end is able to attach to the center receiver.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

FIG. 3 is a top view of the embodiment of FIG. 2.

FIG. 4 is a front view of the embodiment of FIG. 2.

FIG. 5 is a perspective view of a third embodiment of the present invention.

FIG. 6 is a bottom view of the embodiment of FIG. 5.

FIG. 7 is a back view of the embodiment of FIG. 5.

FIG. 8 is a partial, cross-sectional view of the embodiment of FIG. 5.

DESCRIPTION OF THE PREFERRED EMBODIMENTS

Figure 1:
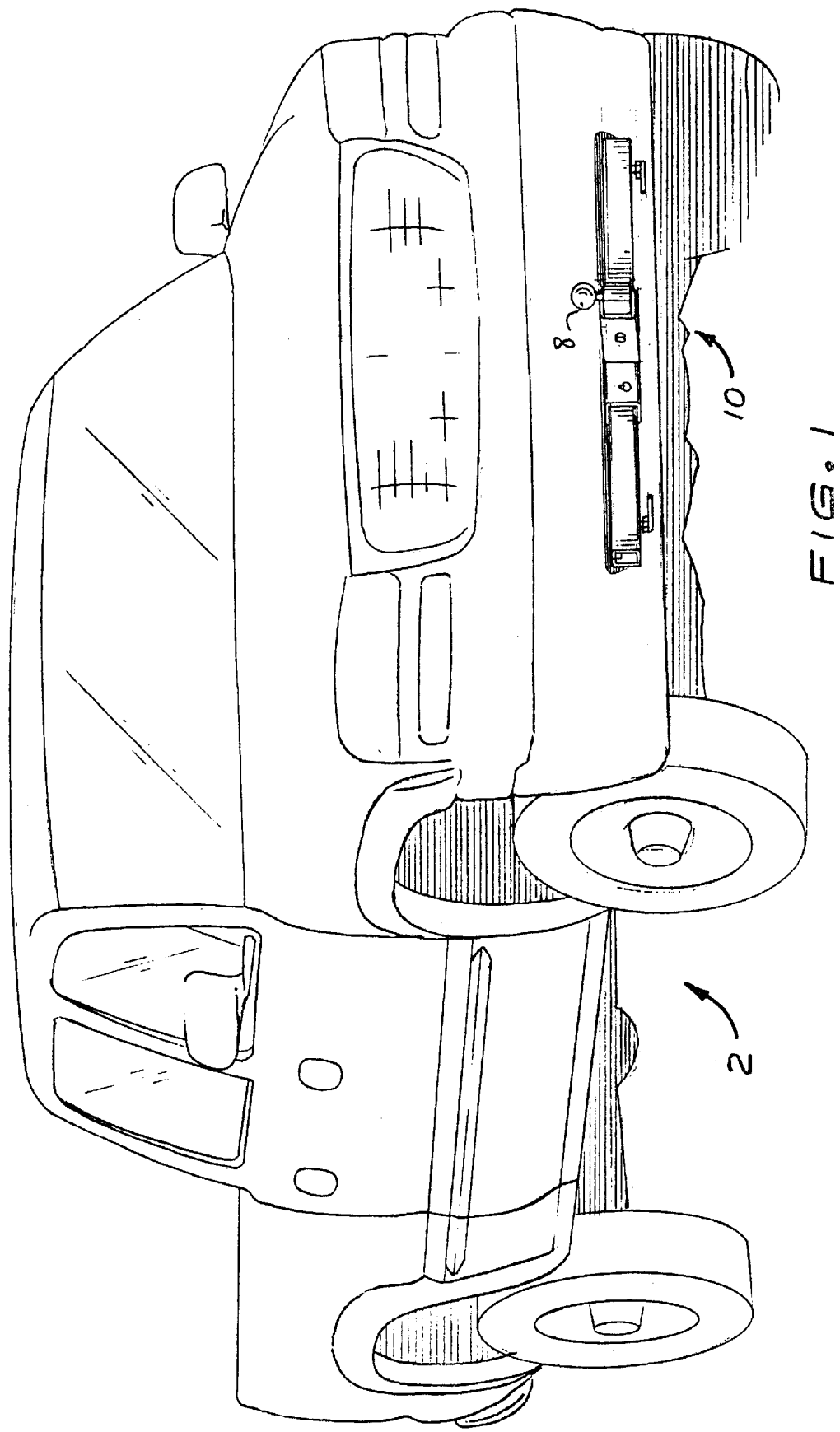
FIG. 1 is a perspective environmental view of one embodiment of the present invention shown installed on a pickup truck.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring initially to FIG. 1, one embodiment of the invented front hitch assembly 10 is shown attached to the front of a vehicle 2. It is preferred that a standard trailer hitch ball connector 8 be used with the invented front hitch assembly 10 so that the front of the vehicle, through using the present invention, may be attached to a trailer or other towed object, thereby allowing the driver of the vehicle to spot the trailer into or out of a space, particularly a confined space. The vehicle 2 shown in FIG. 1 has a first tow hook having a first tow hook point (not shown) and a second tow hook having a second tow hook point (not shown). These hooks are commonly horizontal in orientation in relation to the vehicle and are commonly found on standard makes and models of many trucks, SUV's, and passenger vehicles.

As shown in FIG. 1, the present invention is a front hitch assembly which attaches to the front tow hooks of a vehicle, thereby allowing a trailer to be towed or spotted into place through use of a trailer hitch ball attached to the assembly.

Figure 2:
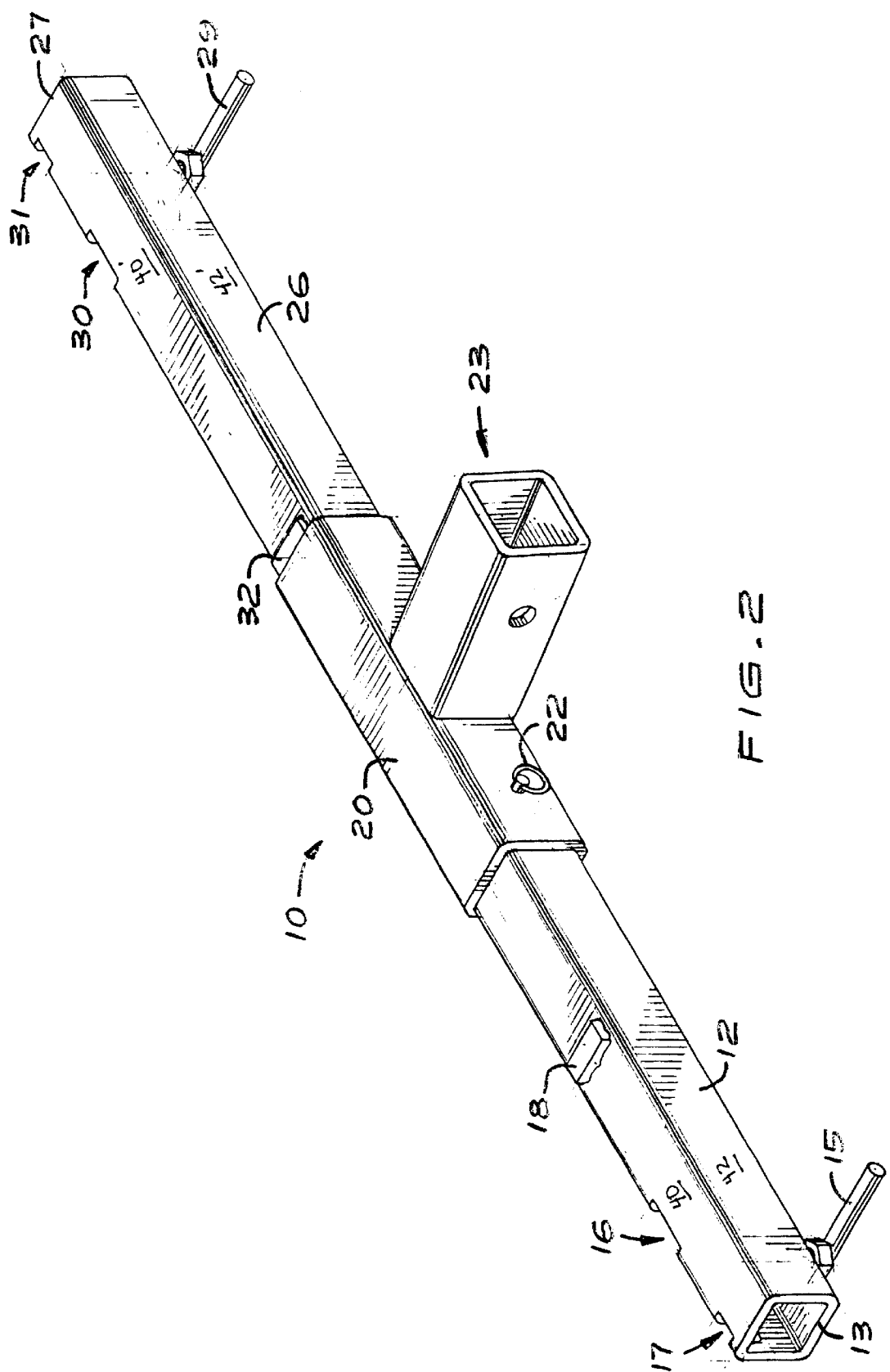
FIG. 2 is a perspective view of a second embodiment of the present invention.

Referring now to FIG. 2, a second embodiment of the present invention is shown. This second embodiment of the front hitch assembly 10 shows a first frame piece 12, a center receiver 20, and a second frame piece 26. The first frame piece 12 is an elongated piece having a first end 13 extending to a second end 14 (shown in FIG. 3). This embodiment preferably uses a square, metal, tubular first frame piece 12 and second frame piece 26, however other shapes and forms of first frame pieces and second frame pieces are also envisioned. The first frame piece 12 has a top side 40 opposite a bottom side and a front side 42 opposite a back side.

The first frame piece 12 preferably has an entrance slot 16 for receiving a vehicle first hook point therethrough (as shown in FIG. 3). The first frame piece 12 additionally has an exit slot 17 for allowing the first vehicle hook point to exit the first frame piece 12. It is preferred that the exit slot 17 be located nearer the first end 13 than the entrance slot 16 is, however, depending upon the orientation and curvature of the vehicle's tow hook, the slots (16, 17) may be located accordingly, or as necessary within the frame piece 12. It is preferred that these slots 16, 17 be located in or near the junction between the top side 40 and back side.

The first frame piece 12 preferably also comprises a first frame piece locking means 15 which is utilized to lock the first frame piece 12 upon the first tow hook 4 when the first tow hook 4 is inserted through the entrance slot 16 and out the exit slot 17. This locking means 15 can comprise any means of locking the first frame piece 12 upon the tow hook 4, however, the preferred method of locking the first frame piece 12 against the first tow hook 4 is shown in FIG. 4. FIG. 4 shows the first frame piece locking means 15 comprising a bolt 34, which extends through a threaded hole 35 located within the bottom side 41 of the first frame piece 12. Thus, this bolt 34 is able to be tightened against the first tow hook 4 thereby pressing the first tow hook 4 against the top 40 of the first frame piece 12. It is preferred that this bolt 34 further comprise a handle 33 for allowing the user to tighten the bolt 34 against the hook 4 by hand.

Referring back to FIG. 2, in this embodiment it is preferred that a center receiver connection stop 18 be located on the first frame piece 12. Likewise, it is preferred that a similar center receiver connection stop 32 be located on the second frame piece 26. These connection stops 18, 32 serve to inhibit lateral movement of the center receiver 20 upon the frame pieces 12 and 26. As can be seen in this figure, it is preferred that the center receiver connection stop 18 be located far enough in (offset) on the first frame piece 12 so that the center receiver 20 can completely be slid onto the first frame piece 12. This would allow the user to attach both the first frame piece 12 and the second frame piece 26 respectively upon the first tow hook 4 and second tow hook 6, bring the second ends 14, 28 of the frame pieces 12, 26 together, and then slide the center receiver 20 from fully on the first frame piece 12 to a position where the center receiver 20 is half on the first frame piece 12 and half on the second frame piece 26, as shown in FIGS. 2—4. When in this position, the center receiver 20 could be locked onto the first and second frame pieces 12, 26 through use of a locking means 22. As seen in FIG. 3, this locking means 22 comprises a self locking release pin 37 which is able to extend through a hole 36 located in the center receiver 20 and in through a hole 38 located in the front side 42 of the first frame piece 12. Likewise, it is also envisioned that the center/receiver connection stop 32 could be offset rather than stop 18 and/or the locking means 22 could be located on the second frame piece.

The second frame piece 26 preferably has an entrance slot 30 for receiving a vehicle second hook point therethrough (as shown in FIG. 3). The second frame piece 26 additionally has an exit slot 31 for allowing the second vehicle hook point 7 to exit the second frame piece 26. It is preferred that the exit slot 31 be located nearer the first end 27 than the entrance slot 30 is, however, depending upon the orientation and curvature of the vehicle's tow hook, the slots (30, 31) may be located accordingly, or as necessary within the frame piece 26. It is preferred that these slots 30, 31 be located in or near the junction between the top side 40' and back side.

The second frame piece 26 preferably also comprises a second frame piece locking means 29 which is utilized to lock the second frame piece 26 upon the second tow hook 6 when the second tow hook 6 is inserted through the entrance slot 30 and out the exit slot 31. This locking means 29 can comprise any means of locking the second frame piece 26 upon the tow hook 6, however, the preferred method of locking the first frame piece 26 against the first tow hook 6 in this embodiment is shown in FIG. 4. FIG. 4 shows the first frame piece locking means 29 comprising a bolt 34', which extends through a threaded hole 35' located within the bottom side 41' of the second frame piece 26. Thus, this bolt 34' is able to be tightened against the second tow hook 6 thereby pressing the second tow hook 6 against the top 40' of the second frame piece 26. It is preferred that this bolt 34' further comprise a handle 33' for allowing the user to tighten the bolt 34' against the hook 6 by hand.

Referring again to FIG. 2, the center receiver 20 has a trailer hitch ball connector 23 for receiving a standard trailer ball hitch assembly 8 (as shown in FIG. 1). Referring now to FIG. 3, the center receiver 20 has a center receiver frame channel 21 extending therethrough from a center receiver first end 43 and a center receiver second end 44. This channel 21 is able to receive therein the second end 14 of the first frame piece 12, as well as the second end 28 of the second frame piece 26. In such a manner, the center receiver 20 is able to slide along the frame piece 12, 26 until the center receiver 20 contacts one of the center receiver connection stops 18, 32. Other means of attaching the second end 14 of the first frame piece 12 in relation to the second end 28 of the second frame piece 26 are also envisioned.

In use (the embodiment shown in FIGS. 2–4), a user would start with either the first frame piece or the second frame piece. For the sake of this discussion, we will assume that the user prefers to attach the first frame piece first. In use, the user would take the first frame piece 12 and insert the first tow hook point 5 into the entrance slot 16. The user would then rotate the first frame piece 12 around so that the first tow hook point 5 would extend out of the exit slot 17 (as shown in FIG. 3). Likewise, the user would do the same for the second frame piece, with the second tow hook point 7 extending into the entrance slot 30 and out of the exit slot 31. In such a fashion, the second end 14 of the first frame piece would be generally adjacent to the second end 28 of the second frame piece.

At this point or earlier, the user would insert the second end 14 of the first frame piece 12 into the center receiver 20 frame channel 21. The user would slide the center receiver 20 onto the first frame piece 12 so that the center receiver 20 contacts the center receiver connection stop 18. At this point, the center receiver second end 44 would generally be inwards or equal to the second end 14 of the first frame piece 12 so that the first frame piece 12. The second frame piece 26 could then be rotated and oriented next to the first frame piece 12 where the second end of the first frame piece and the second end of the second frame piece would be adjacent to one another. The center receiver 20 could then be slid so that the second end of the second frame piece is able to be inserted into the opening entering into the center receiver frame channel 21 which exists in the center receiver second end 44. This thereby would lock the center receiver onto the first frame piece and/or second frame piece. Additionally, locking means 22 could be used to lock the center receiver on the first frame piece and the second frame piece. At this point, the first frame piece locking means 15 and the second frame piece locking means 29 could be tightened down thereby fixedly holding the orientation of the first frame piece and second frame piece so that the trailer hitch ball connector 23 would be held appropriately in line to receive trailer hitch ball assembly 8, as shown in FIG. 4. While this discussion discusses one means of using this embodiment of the present invention and assembling it, other orders are also possible as long as in the end, the desired arrangement is arrived at.

A third embodiment is shown in FIG. 5. This third embodiment of the front hitch assembly 10' consists chiefly of a main frame piece 46. The main frame piece 46 is an elongated piece having a first end 48 extending to a second end 50. This embodiment preferably uses a square, metal, tubular main frame piece 46, however other shapes and forms of main frame pieces are also envisioned. The main frame piece 46 has a top side 52 opposite a bottom side 54 (shown in FIG. 7) and a front side 56 (shown in FIG. 6) opposite a back side 58. In use, the front side 56 faces the object being towed, and the back side 58 faces the towing vehicle.

The main frame piece 46 preferably has a pair of hook receiving slots 60/60' for respectively receiving a vehicle's first and second tow hooks. These slots 60/60' are preferably located in the back side 58 and are spaced apart generally the same distance the vehicle's tow hooks are spaced apart. It is preferred that these slots 60/60' be located, respectively, near the first end 48 and the second end 50, however, depending upon the orientation and curvature of the vehicle's tow hook, the slots may be located accordingly.

The main frame piece 46 preferably additionally has a first tang 62 and a second tang 62'. These tangs 62/62' are for inhibiting movement of the tow hooks when the assembly 10'is installed thereon. It is preferred that these tangs 62/62' extend downwards from the top side 52 along the back side 58, preferably centered within the slots 60/60' as shown in FIGS. 5 and 7. These tangs have a width less than the inside diameter of the curvature of the tow hook so that, as shown in FIG. 6, the tow hook 64/64' may extend through the slot 60/60' into the frame piece 46, with the point of the tow hook extending back out of the frame piece 46 and the tang 62/62' may reside between the inside diameter of the curvature of the tow hook (again, as shown in FIG. 6).

Referring again to FIG. 5, preferably extending from the main frame piece 46 are bracing means 66/66' for supporting the assembly 10' when installed on the vehicle. In this embodiment, these bracing means 66/66' comprise flanges 68/68' which extend outwards to a cross piece 70/70'. In use, the tow hook 64/64' would rest upon the cross piece 70/70', as shown in FIG. 6 and FIG. 8. When a trailer is attached to the assembly 10' via the trailer hitch ball connector 23', the downward force of the weight of the trailer on the hitch ball connector 23' causes the cross piece 70/'70 to be slightly be forced upwards and against the underside of the tow hook 64/64', using the hooks' attachment to the main frame piece 46 as a fulcrum, thereby locking the assembly 10' upon the hook(s).

Referring now to FIG. 6, the tow hooks 64/64' are preferably able to be attached to the main frame piece 46 through use of at least one locking means 72/72'. These locking means 72/72' are utilized to lock the main frame piece 46 upon the tow hooks 64/64' when the tow hooks are inserted into the hook receiving slot 60/60'. This locking means 72/72' can comprise any means of locking the main frame piece 46 upon the tow hooks, however, the preferred method of locking the main frame piece 46 against the tow hooks is shown in FIG. 8.

FIG. 8 shows the main frame piece locking means 72' (72) comprising a bolt 74' (74), which extends through a threaded hole 76' (76) located within the bottom side 54 of the main frame piece 46. Thus, this bolt 74' (74) is able to be tightened against the underside of the tow hook 64' (64) thereby pressing the tow hook against the top 52 of the main frame piece 46 and fixedly holding the tow hook within the main frame piece 46. It is preferred that this bolt 74' (74) further comprise a handle 78' (78) for allowing the user to tighten the bolt 74' (74) against the tow hook 64' (64) by hand.

Referring again to FIG. 5, in this embodiment, the main frame piece 46 has a trailer hitch ball connector 23' for receiving a standard trailer ball hitch assembly 8 (as shown in FIG. 1).

In use (the embodiment shown in FIGS. 5–8), a user would merely hold the assembly 10' with the top side 52 facing upwards. The user would then place the assembly 10' on the tow hooks by sliding the hook receiving slot 60 on the driver's side tow hook 64, and sliding the hook receiving slot 60' on the passenger's side tow hook 64'. The flanges 68/68' would then drop into the curvature of the hook 64/64' and the crosspiece 70/70' would be generally below the hooks 64/64'. The user would then be able to operate one or both of the locking means 72/72' to thereby fixedly hold the main frame piece 46 so that the trailer hitch ball connector 23 would be held appropriately in line to receive trailer hitch ball assembly 8, as shown in FIGS. 1 and 5. While this discussion discusses one means of using this embodiment of the present invention and assembling it, other orders are also possible as long as in the end, the desired arrangement is arrived at.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A front hitch assembly for use with vehicles having a generally horizontally oriented first tow hook having a point, and a generally horizontally oriented second tow hook having a point, said front hitch assembly comprising: an elongated main frame piece having a first end extending to a second end, a top side opposite a bottom side and a front side opposite a back side; said main frame piece further comprising a first hook receiving slot and a second hook receiving slot for respectively receiving said vehicle's first and second tow hooks; wherein said main frame piece further comprises a first tang and a second tang for inhibiting movement of said tow hooks, said tangs extending downwards from said top side along said back side, said first tang centered within said first slot, said second tang centered within said second slot; wherein said first tow hook is able to extend through said first hook receiving slot into said frame piece, with the point of said first tow hook extending back out of said frame piece; wherein said second tow hook is able to extend through said second hook receiving slot into said frame piece, with the point of said second tow hook extending back out of said frame piece; wherein said first tow hook is able to attach to said main frame piece through use of a first locking means and wherein said second tow hook is able to attach to said main frame piece through use of a second locking means; and wherein said main frame piece further comprises a trailer hitch ball connector for receiving a standard trailer ball hitch assembly.

2. A front hitch assembly for use with vehicles having a generally horizontally oriented first tow hook, and a generally horizontally oriented second tow hook, said front hitch assembly comprising a main frame piece having a first end extending to a second end, said main frame piece further comprising at least one first tow hook attachment slot and at least one second tow hook attachment slot, said main frame piece further comprising at least one locking means for locking said main frame piece on said tow hooks, said main frame piece further comprising a trailer hitch ball connector for connecting with a trailer hitch ball assembly.

* * * * *